A. F. McGRATH.
SPRING WHEEL.
APPLICATION FILED FEB. 16, 1921.

1,393,630.

Patented Oct. 11, 1921.

WITNESSES
Edw. Thorpe

INVENTOR
A. F. McGrath
BY
ATTORNEYS

UNITED STATES PATENT OFFICE.

ANDREW F. McGRATH, OF NEW YORK, N. Y.

SPRING-WHEEL.

1,393,630.  Specification of Letters Patent.  Patented Oct. 11, 1921.

Application filed February 16, 1921. Serial No. 445,401.

*To all whom it may concern:*

Be it known that I, ANDREW F. McGRATH, a citizen of the United States, and a resident of the city of New York, borough of Manhattan, in the county and State of New York, have invented a new and Improved Spring-Wheel, of which the following is a description.

My invention relates to spring wheels and the general object of the invention is to provide a wheel of the indicated type improved in various particulars with respect to the arrangement and form of the resilient elements, whereby to provide for yielding of the wheel rim relatively to the hub portion and characterized by strength and simplicity as well as convenience of assemblage.

Reference is to be had to the accompanying drawings forming a part of this specification.

Figure 1:
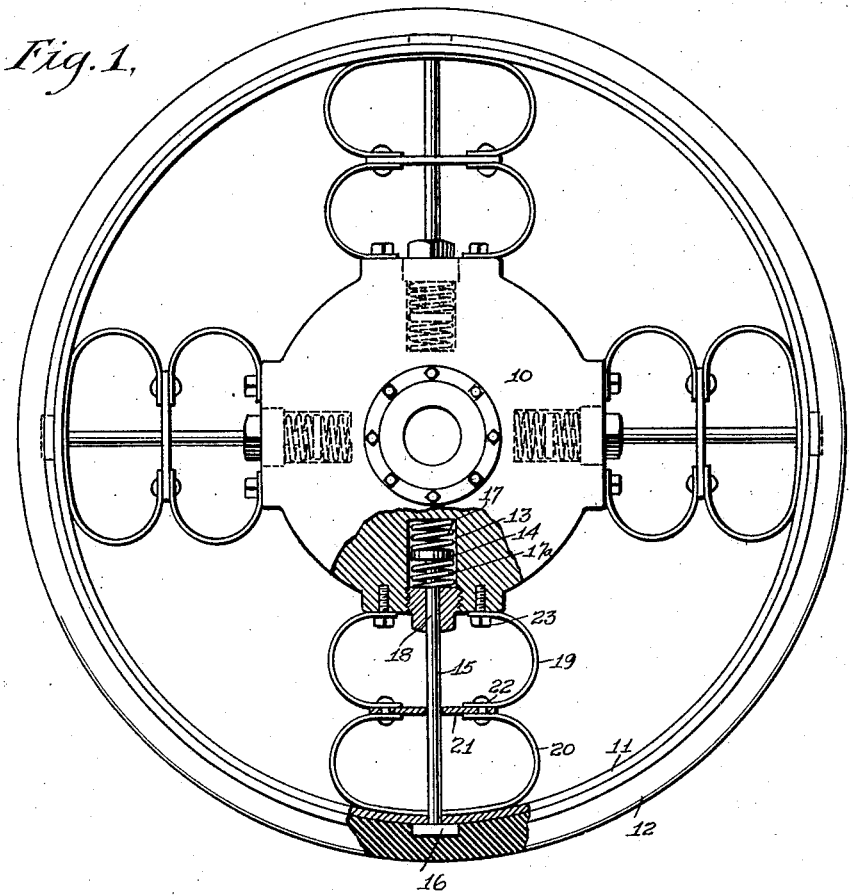
Figure 1 is a partly sectional side elevation of a wheel embodying my invention.

Referring at first more particularly to Fig. 1, the numeral 10 indicates a hub of a wheel adapted to be applied to an axle, and 11 indicates a rim having any approved tire 12. In the hub 10 are radial pockets 13 in which operate plungers 14 on resilient spokes 15, said spokes being secured in any suitable manner to the rim 11, there being shown heads 16, it being understood that the heads 16 and plungers 14 may be secured by any approved means. In each pocket 13 are coil springs 17 between the plungers 14 and the inner ends of the pockets and other springs $17^a$ coiled about the spokes 15 at the outer sides of the plungers 14, the springs being yieldable to the movement of the plungers radially inward or outward, when the spokes are vertically disposed, said spokes by their resiliency yielding laterally when disposed horizontally or at any angle to the vertical. The outer ends of the springs $17^a$ abut against screw plugs or bushings 18, screwing into the hub 10 at the pockets 13 and closing the latter.

In connection with each resilient spoke 15, I provide bowed springs 19, 20, these being arranged in pairs, the springs 19 associated with a given spoke being radially inward from the adjacent spring 20. Preferably, the outer springs 20 are formed unitary while the separate bowed springs 19 are provided at each side of the spoke 15. A spoke 15 passes through the adjacent spring 20 and through a collar 21 slidable on said spoke, the adjacent ends of the springs 19, 20 being secured to said collar by rivets 22 or equivalent fastening means. The inner ends of the springs 19 are secured by screw bolts 23 to the hub 10.

Figure 2:
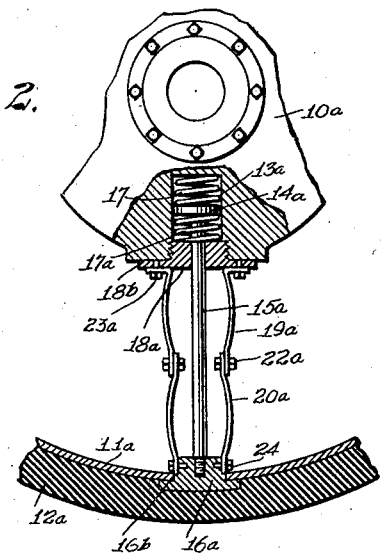
Fig. 2 is a fragmentary partly sectional side elevation illustrating a modification.

In Fig. 2 the hub section $10^a$ has pockets $13^a$ receiving the plunger $14^a$ pertaining to each resilient spoke $15^a$, the described springs 17, $17^a$ being employed in this construction also. The spring $17^a$ abuts against a bushing or screw plug $18^a$ having a flange $18^b$ which is secured by a bolt, $23^a$, to the hub $10^a$, said bolts also serving to secure the inner ends of springs $19^a$ disposed at opposite sides of resilient spoke $15^a$. The outer ends of the springs $19^a$ are secured to springs $20^a$, both of said springs being slightly bowed and the outer ends of spring $20^a$ being secured by bolts 24 to a block $16^a$ into which the outer end of spoke $15^a$ screws, said block being flanged as at $16^b$ at the outer side of the rim $11^a$ at the inner side of the tire $12^a$. The adjacent ends of the springs $19^a$, $20^a$ are secured together by transverse bolts $22^a$, or other suitable fastening means. The springs $19^a$, $20^a$ are slightly bowed to permit them to flex in response to the axial movement of a spoke $15^a$ and also they may flex laterally in response to a lateral flexure of the spoke.

The arrangement of separate springs $19^a$, $20^a$ is to minimize the strains on the springs for reducing the liability of breakage and also the arrangement serves to minimize the expense in renewing the breakage should it occur.

Having thus described my invention, I claim:

1. A wheel of the class described including a hub section, a rim separate from the hub section, resilient spokes movable axially relatively to the hub, and adapted to flex laterally, springs acting on the inner ends of said spokes, the outer ends of the spokes being secured to the rim, springs oppositely disposed in pairs at opposite sides of each spoke to flex toward and from each other transversely to the spokes and secured at their inner ends to the hub, and additional oppositely disposed springs placed radially outward from the second-mentioned springs, the second-mentioned and the third-mentioned springs having their adjacent ends fastened together.

2. A wheel of the class described including a hub section, a rim separate from the hub section, resilient spokes movable axially relatively to the hub, and adapted to flex laterally, springs acting on the inner ends of said spokes, the outer ends of the spokes being secured to the rim, springs disposed at opposite sides of each spoke and secured at their inner ends to the hub, additional springs placed radially outward from the second-mentioned springs, collars slidable on the spokes, and means fastening the adjacent ends of the second-mentioned and third-mentioned springs to said collars.

ANDREW F. McGRATH.